(12) United States Patent
Korten et al.

(10) Patent No.: US 11,345,087 B2
(45) Date of Patent: May 31, 2022

(54) DEVICE AND METHOD FOR PROGRESSIVELY BUILDING UP AN OBJECT FROM A LIGHT HARDENABLE MATERIAL

(71) Applicant: 3M INNOVATIVE PROPERTIES COMPANY, St. Paul, MN (US)

(72) Inventors: Malte Korten, Moorenweis (DE); Gioacchino Raia, Turkenfeld (DE); Adrian S. Eckert, Herrsching (DE); Bernhard Hofmann, Peissenberg (DE); Christian A. Richter, Feldafing (DE); Bastian P. Kirchner, Furstenfeldbruck (DE); Anja Friedrich, Gilching (DE); Helmar B. Mayr, Kaufering (DE); Carsten Franke, St. Paul, MN (US); Gallus Schechner, Herrsching (DE)

(73) Assignee: 3M Innovative Properties Company, St. Paul, MN (US)

( * ) Notice: Subject to any disclaimer, the term of this patent is extended or adjusted under 35 U.S.C. 154(b) by 563 days.

(21) Appl. No.: 16/321,534

(22) PCT Filed: Jul. 28, 2017

(86) PCT No.: PCT/US2017/044278
§ 371 (c)(1),
(2) Date: Jan. 29, 2019

(87) PCT Pub. No.: WO2018/026640
PCT Pub. Date: Feb. 8, 2018

(65) Prior Publication Data
US 2019/0176394 A1    Jun. 13, 2019

(30) Foreign Application Priority Data

Aug. 3, 2016 (EP) .................................... 16182541

(51) Int. Cl.
*B29C 64/245* (2017.01)
*A61C 13/00* (2006.01)
(Continued)

(52) U.S. Cl.
CPC ........ *B29C 64/245* (2017.08); *A61C 13/0013* (2013.01); *A61C 13/0019* (2013.01);
(Continued)

(58) Field of Classification Search
CPC ............ B33Y 30/00; B29K 2105/0002; B29K 2509/00; B29L 2031/753
(Continued)

(56) References Cited

U.S. PATENT DOCUMENTS 5,071,337 A    12/1991    Heller
9,204,945 B2   12/2015    Korten
(Continued)

FOREIGN PATENT DOCUMENTS

DE    102007010624    9/2008
EP        3018531     5/2016
(Continued)

OTHER PUBLICATIONS

International Search Report for PCT International Application No. PCT/US2017/044278, dated Jan. 30, 2018, 6 pages.

*Primary Examiner* — Jeffrey M Wollschlager
*Assistant Examiner* — Xue H Liu (57) ABSTRACT

A device for progressively building up an object from a light hardenable material. The device has a perforated build platform for the object. The build platform forms a build surface that faces a light source. The build platform and the light source are positionable relative to each other by computer control. The device is further configured for supplying the light hardenable material through the perforation of the build platform for building up the object. The (Continued)

invention enables the making of colored objects by stereolithography.

13 Claims, 6 Drawing Sheets (51) Int. Cl.
*B33Y 10/00* (2015.01)
*B33Y 30/00* (2015.01)
*B29C 64/135* (2017.01)
*B29C 64/129* (2017.01)
*A61C 13/087* (2006.01)
*B29C 64/20* (2017.01)
*A61C 13/08* (2006.01)
*B29K 105/00* (2006.01)
*B29K 509/00* (2006.01)
*B29L 31/00* (2006.01)

(52) U.S. Cl.
CPC .......... *A61C 13/082* (2013.01); *A61C 13/087* (2013.01); *B29C 64/129* (2017.08); *B29C 64/135* (2017.08); *B29C 64/20* (2017.08); *B33Y 10/00* (2014.12); *B33Y 30/00* (2014.12); *B29K 2105/0002* (2013.01); *B29K 2509/00* (2013.01); *B29L 2031/753* (2013.01)

(58) Field of Classification Search
USPC ...................................................... 425/174.4
See application file for complete search history.

(56) References Cited

U.S. PATENT DOCUMENTS

| | | |
|---|---|---|
| 9,326,833 B2 | 5/2016 | Kirchner |
| 9,522,050 B2 | 12/2016 | Mayr |
| 9,827,076 B2 | 11/2017 | Korten |
| 10,028,810 B2 | 7/2018 | Korten |
| 2001/0048183 A1 | 12/2001 | Fujita |
| 2008/0174050 A1 | 7/2008 | Kikuchi |
| 2014/0377718 A1 | 12/2014 | Korten |
| 2017/0319358 A1 | 11/2017 | Kloke |
| 2018/0370136 A1 | 12/2018 | Stadlmann |

FOREIGN PATENT DOCUMENTS

| | | |
|---|---|---|
| JP | 7-60843 | 3/1995 |
| WO | WO 96/23647 | 8/1996 |
| WO | WO 2014-078537 | 5/2014 |
| WO | WO 2014/126837 | 8/2014 |
| WO | WO 2015-015261 | 2/2015 |

DEVICE AND METHOD FOR PROGRESSIVELY BUILDING UP AN OBJECT FROM A LIGHT HARDENABLE MATERIAL

FIELD OF THE INVENTION

The invention relates to device for progressively building up an object from a light hardenable material and a method for progressively building up an object from a light hardenable material.

BACKGROUND ART

In the field of dentistry, dental restorations, for example replacement teeth, are more and more manufactured in automated processes, which typically include the use of computer-aided design (CAD) techniques and manufacturing by Computer Numerical Controlled (CNC) machines. Further, so-called build-up processes have been proposed for making of dental restorations. Such a build-up process typically allows building up an individual dental restoration in substantially its desired individual shape, generally by subsequently adding material to create that shape instead of providing an oversized standardized blank from which material is removed in a subsequent process.

While build-up processes are meanwhile widely used in the industry for rapid prototyping, the manufacturing of final products in many areas is still challenging. For making dental restorations it is generally required to use materials that are compatible for use in a human body. Further, a dental restoration manufactured by a build-up process must fulfill requirements to mechanical stability as well as expectations about aesthetics, concerning for example color shading and translucency.

Some rapid prototyping systems are based on stereolithography. Stereolithography generally uses light (typically a UV laser) for hardening a light hardenable or photopolymer resin. Data based on computer aided design and/or computer aided manufacturing (CAD/CAM) are used to project a light pattern on a layer of light hardenable resin. The photosensitive resin typically solidifies in consequence of the exposure of the light so that a layer of solidified resin according to the pattern is formed. A desired three-dimensional object is created by consecutively adding layers. Thereby the pattern is controlled according to the desired outer shape of the three-dimensional object. Typical stereolithography systems are configured for operating with a single resin.

Although existing processes for making dental restorations are advantageous in different respects there is a general desire to provide a process for making individual or customized dental restorations at a high degree of automation, maximized quality and minimized costs.

SUMMARY OF THE INVENTION

The invention relates to a device for progressively building up an object from a light hardenable material. The device comprises a perforated build platform for the object. The build platform forms a build surface that faces a light source. Further, the build platform and the light source are positionable relative to each other by computer control. The device is further configured for supplying the light hardenable material through the perforation of the build platform for building up the object.

In another aspect of the invention the perforation in the build platform is optional and different light hardenable materials may be provided for building up the object. In particular, a device may be provided for progressively building up an object from a light hardenable material. The device comprises a build platform for the object. The build platform forms a build surface that faces a light source. The build platform and the light source are positionable relative to each other by computer control. The device is configured for supplying different light hardenable materials (for example light hardenable materials of different colors, materials, material strengths or translucencies) for building up the object.

It is preferred that the device is configured for building up the object vertically. Further, the object built up is preferably retained at the build platform and any portions or layers are added at a free end of the object opposite of the end of the object that is retained at the build platform.

The terms "vertical" or "vertically" for the purpose of the present specification refer to a dimension generally in a dimension of the force of gravity. The terms "horizontal" or "horizontally" for the purpose of the present specification refer to a dimension generally transverse to a dimension of the force of gravity. Preferably, the vertical and horizontal dimension are perpendicular. The vertical and horizontal dimension may be used herein for designating dimensions of the device of the invention. In this regard, the dimensions relate to dimensions of the device when it is oriented for normal use. In particular, any misalignment of the device relative to the actual force of gravity, for example during transport of the device or use of the device on any uneven or inaccurate ground, does not withstand the general designation of the vertical or horizontal dimension.

The invention is advantageous in that it enables the making of dental restorations relatively rapidly and at a maximized optical quality. In particular, the invention allows for building up color graded dental restorations from differently colored light hardenable materials. The invention is further advantageous in that it provides such components that are in direct contact with the light hardenable material(s) as exchangeable components. Accordingly, the device of the invention can be rapidly set up for different jobs in the building up of several objects, in particular dental restorations. Therefore the device may be particularly useful for the chairside making of dental restorations (meaning the making of dental restorations directly in a dentist's office).

In an embodiment the perforation is formed by a plurality of passageways extending through the build platform. The passageways may extend along a uniform cross-section. The passageways preferably have the same or generally the same cross-section, for example may have the same or generally the same diameter. Further, the passageways may taper toward the build surface. The tapered passageways preferably have the same or generally the same cross-section at the build surface and the same angle of taper, for example may have the same or generally the same diameter at the build surface and the same angle of taper. Furthermore, the build platform may have a rough build surface, for example a build surface having a roughness of at least 2 μm ($R_a$ according to the standard DIN EN ISO 4287:2010).

In one embodiment the device has a receptacle for receiving the light hardenable material. The receptacle has a first end that is closed by the build platform and an open second end. The second end may be closed by a piston that is movably arranged within the receptacle for urging the light hardenable material toward the perforation. Such a receptacle may be pre-filled with the light hardenable material or light hardenable materials of different colors. The device may have an actuator for moving the piston in a controlled manner by computer control. Accordingly, the device can control the amount and/or a supply rate of the light hardenable material during building up the object.

In a further embodiment a tank for the light hardenable material is provided for supplying the light hardenable material through the open second end into the receptacle. In this embodiment light hardenable material can be supplied into the receptacle from the tank in an amount and/or supply rate as needed for building up the object.

Preferably, the receptacle is arranged with the first end or with the build platform oriented toward the center of gravity (downwards) and with the second open end away from the center of gravity (upwards). Accordingly, the light hardenable material provided in the receptacle may be urged through the perforation by the force of gravity, at least in embodiments that are not provided with any means for urging the light hardenable materials toward the build platform.

In one embodiment a spout is provided within the receptacle. The spout preferably has an inlet for the light hardenable material and an outlet for the light hardenable material. The outlet is preferably formed by a perforated wall of the spout which entirely covers the perforation of the build platform. Thus, the spout spreads any light hardenable material supplied via the inlet toward the perforation of the build platform. Therefore, a relatively uniform distribution of the light hardenable material across the perforation of the build platform can be achieved.

In one embodiment the device further comprises a circumferential containment forming a hole within which the build platform can be positioned. Preferably, the receptacle and the containment are shaped and dimensioned such that the receptacle snugly fit into the hole of the containment. In particular, the receptacle may have a cylindrical outer shape with a first diameter. And the hole of the containment may have a cylindrical inner shape having a second diameter that is greater, preferably slightly greater, than the first diameter.

In a further embodiment the light source comprises a transparent plate. Preferably, the containment is or can be disposed on the transparent plate. The transparent plate on one major side forms an exposure surface. The exposure surface is typically the surface on or adjacent which the light hardenable material is exposed to light for hardening the light hardenable material.

In one embodiment the hole of the containment is a through-hole. In other words the containment may have a general ring-shape. The containment in combination with the plate preferably forms a reservoir in which the light hardenable material is hardenable by light emitted by the light source. The containment may form a repository for excess light hardenable material. For example, the device is preferably configured such that light hardenable material contained in the hole can be replaced in that further light hardenable material is provided into the hole. The material initially contained in the hole thereby is displaced into the repository. Accordingly, the hole and the repository are preferably in fluid communication through (or past) a wall that separates the hole and the repository from each other. The containment may be disposable. In particular, any light hardenable material received within the repository may be disposed together with the containment. The light hardenable material may be hardened, for example by exposure to a separate light source (for example provided by a dental light irradiation device), prior to disposal.

In one embodiment the device further comprises a tray that comprises the containment. The tray may have at least a transparent portion that overlaps or closes one opening of the hole. For example, the hole may be sealingly closed by a transparent element. Thus, the exposure surface of the transparent platform of the device is prevented from being contaminated by light hardenable material during an object is built up.

In a further embodiment the device comprises the light hardenable material. The light hardenable material is optionally provided in the form of at least two partial quantities of different colors. Further the light hardenable material may be provided in the form of at least two partial quantities of different colors, translucencies, material strengths or combinations thereof. The at least two quantities may pre-filled in the receptacle.

In a preferred embodiment the build platform is disposable and replaceable by another build platform. In particular receptacle including the build platform as well as the containment may be disposable and replaceable.

In one embodiment a kit is provided, comprising a plurality of receptacles and containments of the same or similar configuration. The receptacles may be pre-filled with light hardenable material of different colors.

The receptacle and the containment may be made of a plastic material, for example injection molded from a plastic material. Suitable plastic materials comprise, for example, polyethylene (PE), polypropylene (PP), polycarbonate (PC) and polymethyl-methacrylate (PMMA). Any transparent parts, for example the transparent element of the tray is preferably made of a transparent plastic material, for example PC or PMMA. The transparent element may be provided with a nonstick coating or film on a surface that faces the build platform. The coating or film may comprise a silicone layer that is provided with a polytetrafluorethylene (PTFE) layer. In such configuration the silicone layer is arranged between the PTFE layer and the transparent element. Such configuration provides for an easy detachment of the hardened material from the transparent element. The same type of nonstick coating or film may be provided on the transparent plate of the device.

The light hardenable material may comprise a radically curable unsaturated monomer in an amount ranging from 20% to 99% per weight, an inorganic filler in an amount ranging from 1% to 80% per weight and a photoinitiator in an amount ranging from 0.001% to 5% per weight.

In one aspect the invention relates to a method for progressively building up an object from a light hardenable material. The method comprises the steps of:
(a) providing a device that comprises a perforated build platform for the object, the build platform forming a build surface that faces a light source, the build platform and the light source being positionable relative to each other by computer control, wherein the device is configured for supplying the light hardenable material through the perforation of the build platform for building up the object;
(b) positioning the build surface relative to the light source;
(c) providing a portion of the light hardenable material through the perforation of the build platform in an area between the build surface and the light source;
(d) causing at least part of the portion of the light hardenable material to harden by light emitted from the light source;
(e) repeating steps (b) to (d) and thereby building up the object.

The method is preferably based on a use of the device of the invention in the embodiments as described herein. In particular, in step (a) a device of the invention may be provided.

In step (c) the light hardenable material may be provided through the perforation of the build platform by the force of gravity only. The skilled person will recognize that alternatively the light hardenable material may be pressed through the perforation of the build platform by an energy driven actuator, for example a piston.

Further, in the device and the method the build platform and the light source are preferably positionable at different distances relative to each other. The distance between the build platform and the light source preferably forms a build volume in which the object can be built up.

During step (e) in each occurring step (b) the build surface may be retracted from the light source by the same pre-determined travel. Retracting of the build surface from the light source increases the distance of the build surface relative to the light source by the pre-determined travel. The so formed additional space between the build surface and the light source fills or is filled by light hardenable material in the respective step (c) a pattern of which is caused to harden in the respective subsequent step (d). Accordingly, during step (e) the build platform is preferably moved upwards stepwise and the object is build up layerwise. It is noted that the movement of the build platform may alternatively be continuous while the light hardenable material is continuously fed into the build volume and exposed to a constant or varying light pattern continuously or in a flashing manner.

In one embodiment step (c) comprises the step of providing a portion of the light hardenable material having a first color in the area between the build surface and the light source. Further, the method may comprise the step of providing a portion of the light hardenable material having a second color in the area between the build surface and the light source and thereby displacing (and replacing) the portion of the light hardenable material having the first color. For replacing the light hardenable material of the first color the amount of the light hardenable material of the second color is selected so as to entirely displace the light hardenable material having of the first color from the reservoir.

In a further embodiment the method comprises the step of storing the portion of the light hardenable material having the first color in a repository of a containment of the device. The method may comprises the step of changing the color of the light hardenable material provided for building up the object. For changing the color of the light hardenable material present in the build volume a differently colored light hardenable material may be urged into the build volume so that the present light hardenable material is displaced from the build volume and replaced by the differently colored light hardenable material. For example, the light hardenable material of the first color may be displace from the build volume and replaced by the light hardenable material of the second color. For recognizing the color change the device of the invention may have a color sensor that in arranged for sensing the color of the light hardenable material arriving in the repository. Alternatively or additionally a color sensor may be provided that is arranged for sensing the color of the light hardenable material in the build volume.

It is noted that the light hardenable material may not only be provided at different colors as described, but in addition or alternatively may be provided at different material compositions, translucencies or strength properties. The color, strength and translucency properties thereby preferably refer to properties of the light hardenable material when hardened.

DETAILED DESCRIPTION OF THE INVENTION

Figure 1:
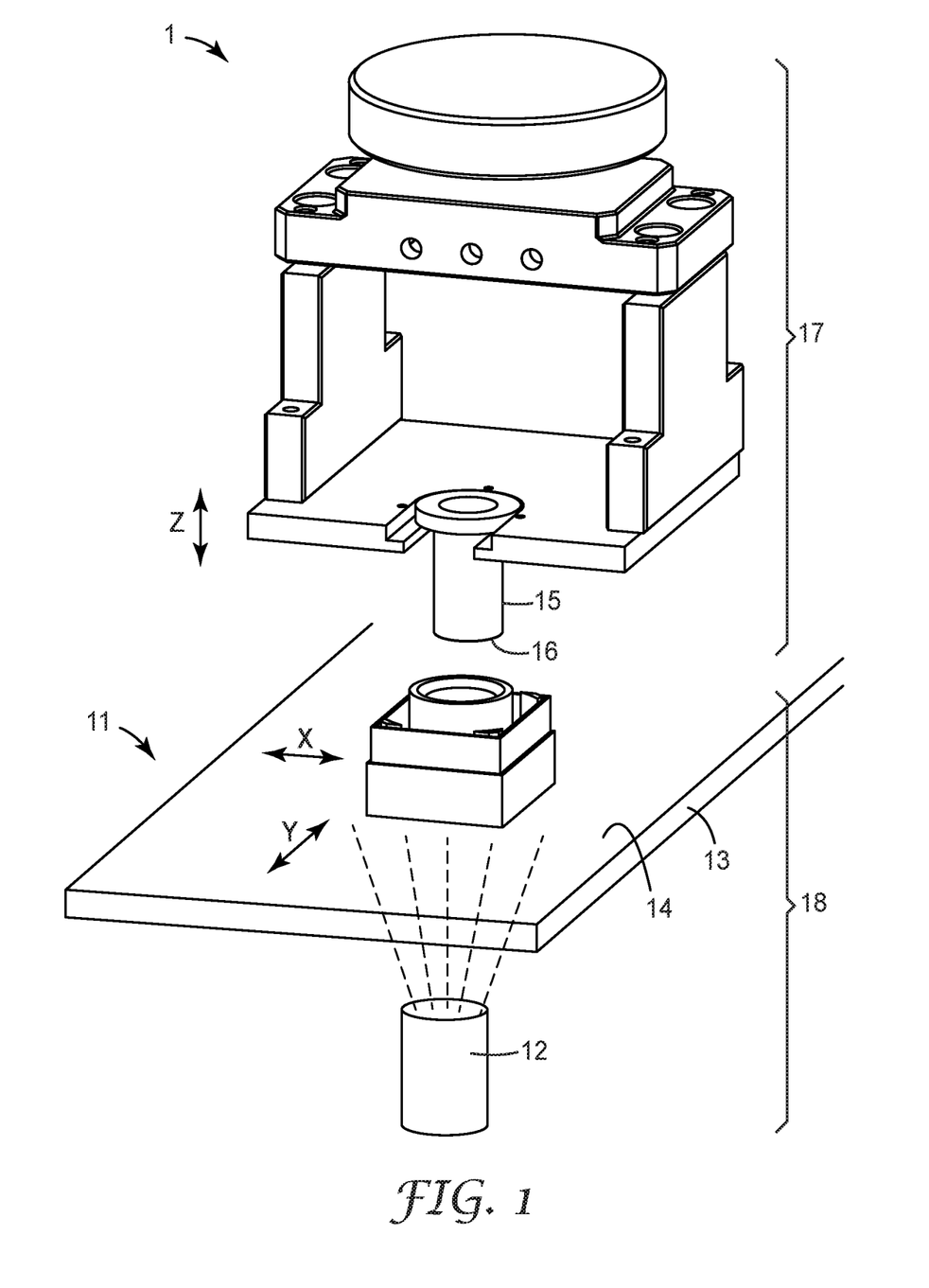
FIG. 1 is a perspective view of a device according to an embodiment of the invention.

FIG. 1 shows a device 1 for progressively building up an object from a light hardenable material. The device 1 is based on the so-called Digital Light Processing (DLP) technique, in which a light hardenable material is irradiated by a two-dimensional light pattern so as to create a layer of hardened material shaped in accordance to that pattern. An object can be built up by providing a multiplicity of such layers. The layers typically have the same or a pre-determined uniform thickness but can be individually two-dimensionally shaped laterally to the thickness based on different light patterns. It is however possible to build up an object by providing a multiplicity of layers having different thicknesses. Therefore three-dimensional objects of a great variety of different shapes can be built up with this technique. To create the light pattern the device 1 has a light source 11 which in this example comprises a digital light projector 12 and a transparent plate 13. The transparent plate 13 exhibits an essentially planar exposure surface 14. The exposure surface 14 is oriented generally horizontally. Further the exposure surface 14 is oriented upwards, meaning faces away from the center of gravity.

The device 1 further has a build platform 15 having a build surface 16 (not visible in this view) that faces the exposure surface 14. The area between the build surface 16 and the exposure surface 14 is a build volume, meaning an area in which the object can be built up. The device 1 is configured such that the build surface 16 and the exposure surface 14 can be positioned relative to each other by computer control. In particular, the distance between the build surface 16 and the exposure surface 14 relative to each other can be controlled by the computer. In the example the device 1 has a movable head 17 that can be positioned relative to a base 18 of the device 1. The head 17 is movable vertically, for example by means of a motor drivable linear guide. The head 17 may for example be mounted in a commercially available 3D printer that is based on the Digital Light Projection (DLP) technique.

The digital light projector 12 is arranged underneath the transparent plate 13. In particular, seen from the head 17 the digital light projector 12 is arranged behind the transparent plate 13 for projecting light through the transparent plate 13 toward the build volume. The digital light projector 12 is configured for projecting light at a two-dimensional pattern. The light pattern may be based on a matrix of a multiplicity of pixels arranged in a regular pattern, for example like a checkerboard. The digital light projector 12 is configured such that each pixels of the pattern can be illuminated or left dark. The resolution of the light pattern adjacent the exposure surface 14 determines the accuracy at which the object can be built up in the horizontal dimensions, designated as X and Y in the Figure. The accuracy of the object in the vertical dimension (designated as Z in the Figure) is generally determined by the precision at which build surface 16 and the exposure surface 14 can be positioned relative to each other. The control of the light pattern may be provided by a so-called Digital Micro-mirror Device (DMD). The DMD comprises a multiplicity of individually rotatable small mirrors which can be oriented for deflecting light from a light beam toward the pattern to generate a light pixel or away from that pattern to generate a dark pixel. The skilled person will recognize other techniques for light projection. For example, the projector may be based on the LCD (Liquid Crystal Display) projection technique. The light pattern may further be based on a movable light beam, for example a laser beam. In this technique the pattern may or may not be based on a matrix of pixels.

The light beam used for the light projection comprises light in a wavelength range that is required for hardening the light hardenable material, in the example a wavelength range of about 365 nm to about 470 nm or within a suitable ultraviolet wavelength range.

Figure 2:
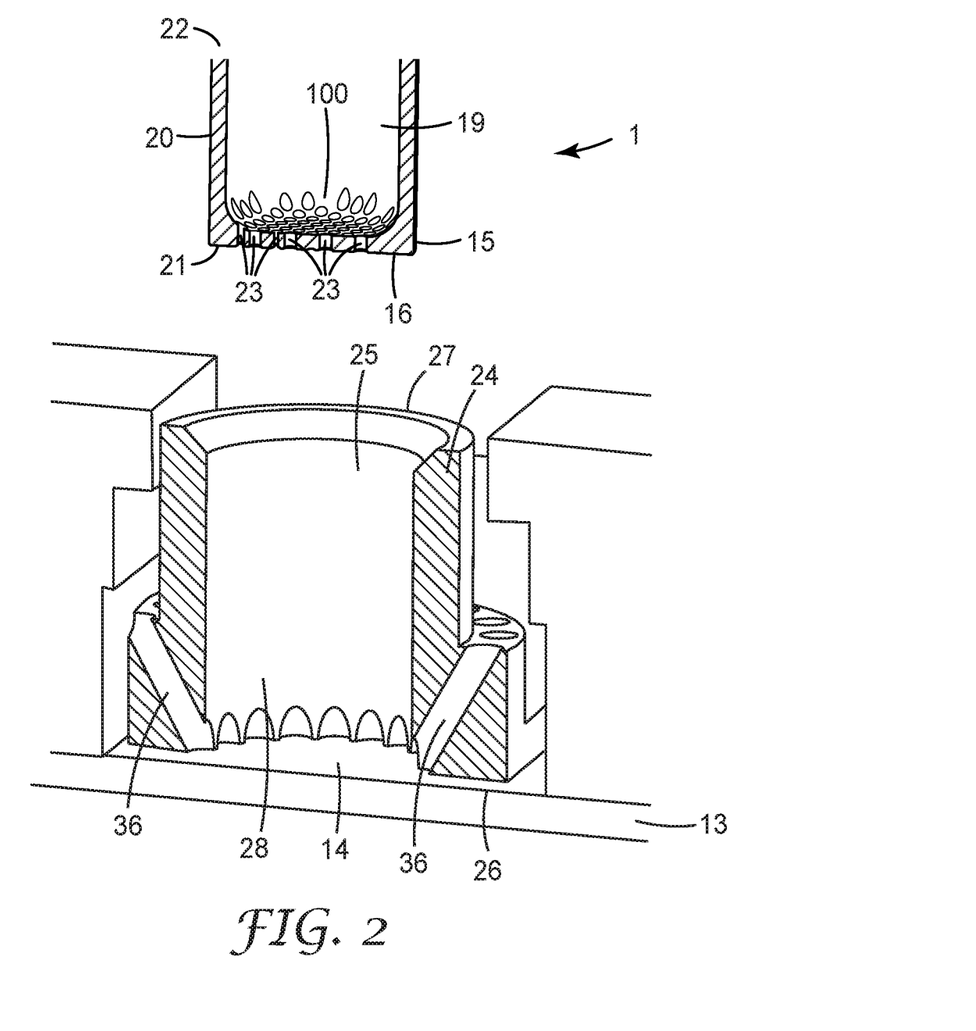
FIG. 2 is a perspective view of a portion of the device according to an embodiment of the invention.

FIG. 2 shows a portion of the device 1 in further detail. In particular, the device 1 has a receptacle 19 for receiving light hardenable material 100 therein. The receptacle 19 is formed by a circumferential side wall 20 and the build platform 15. The receptacle 19 is closed at a first end 21 by the build platform 15 and has an open second end 22. The receptacle 19 is oriented such that the build platform 15 forms a bottom of the receptacle 19 from which the side wall extends upwards. Accordingly, any light hardenable material provided into the receptacle 19 flows toward the first end 21 on the build platform 15 by natural force of gravity. As illustrated, the build platform 15 is perforated. In particular, the perforation is formed by a plurality of passageways 23 through the build platform 15. The cross-section of the passageways 23 and the number of passageways are selected in accordance to the viscosity of the light hardenable material such that the light hardenable material flows through the passageways 23 by natural force of gravity. It is noted that the situation in the Figure is illustrated for the purpose of describing the structure of the device 1. In a situation in which no object is present and in which the build platform 15 is positioned remote from the exposure surface 14 the light hardenable material may not yet be provided into the receptacle 19. However, the light hardenable material may be provided into the receptacle 19 if it is positioned with the build surface 16 on or in close proximity to the exposure surface 14, as described in more detail further below. The passageways 23 may extend through the build platform 15 at a uniform cross-section or may taper from an inside of the receptacle 19 toward the build surface 16. This helps maximizing a retention of an object built on the build surface 16 and hanging from build platform 15 as further described in more detail below.

The device further has a circumferential containment 24 forming a hole 25 within which the build platform 15 can be positioned. This means that the build platform 15 and the receptacle 19 at least adjacent the first end 21 fits into the hole 25 of the containment 24. The containment 24 has a first end 26 and a second end 27. In the example, the hole 25 is a through-hole which extends between the first and the second end 26, 27. The first end 26 of the containment 24 sits on the exposure surface 14 of the transparent plate 13 so that a reservoir 28 is formed by the transparent plate 13 in combination with the containment 24. Because the first end 26 of the containment 24 is generally planar, it seals sufficiently on the generally planar exposure surface 14 to prevent a significant amount of light hardenable material to escape though the interface between the containment 24 and the exposure surface 14. Accordingly, light hardenable material provided in the hole 25 flows onto the exposure surface 14 and is captured by the containment 24 so that a certain amount of light hardenable material provided in the hole 25 results in a predictable fill level within the hole 25.

For building up an object the receptacle 19 is positioned into the hole 25 of the containment so that the build surface 16 is in contact with (or in very close proximity to) the exposure surface 14. Subsequently, a determined amount of light hardenable material is provided into the receptacle 19. By natural force of gravity the light hardenable material flows toward the build platform 15 and through the passageways 23 on the exposure surface 14. To enable the flow of the light hardenable material and for generating a first layer of hardened material the build platform may be positioned (or retracted) at a space relative to the exposure surface. That space automatically fills with the light hardenable material provided through the passageways 23. As the space is filled with light hardenable material the light source (not designated in this view) is activated for projecting a light pattern to the light hardenable material. The light pattern causes to the light hardenable material to harden in accordance with the pattern.

According to the invention the pattern is selected such that at least part of the passageways remain uncovered from hardened material. This enables that further light hardenable material can be provided through the uncovered passageways for building up further layers. Further, preferably some of the passageways are covered by the hardened material. It has been found that the light emitted from the light source reaches into the passageways and causes at least a portion of the light hardenable material in the passageways to harden. Therefore the retention of the hardened material can be maximized. Due to the tapered shape of the passageways the retention can by even further maximized by providing a positive lock of the hardened material within the passageways.

An object can be built up by repeating the positioning of the build platform 15, providing further light hardenable material and projecting a light pattern. It is noted that although the principle process of building up the object is based on a sequential order of these steps it is also possible to continuously retract the build platform 15 from the transparent plate 13 while the light pattern or different light patters are projected consecutively. In this process the light hardenable material may be provided into the receptacle 19 continuously or batchwise. It is further possible to crossfade two consecutive patterns into one another to avoid the creation of sharp steps at the object.

Figure 3:
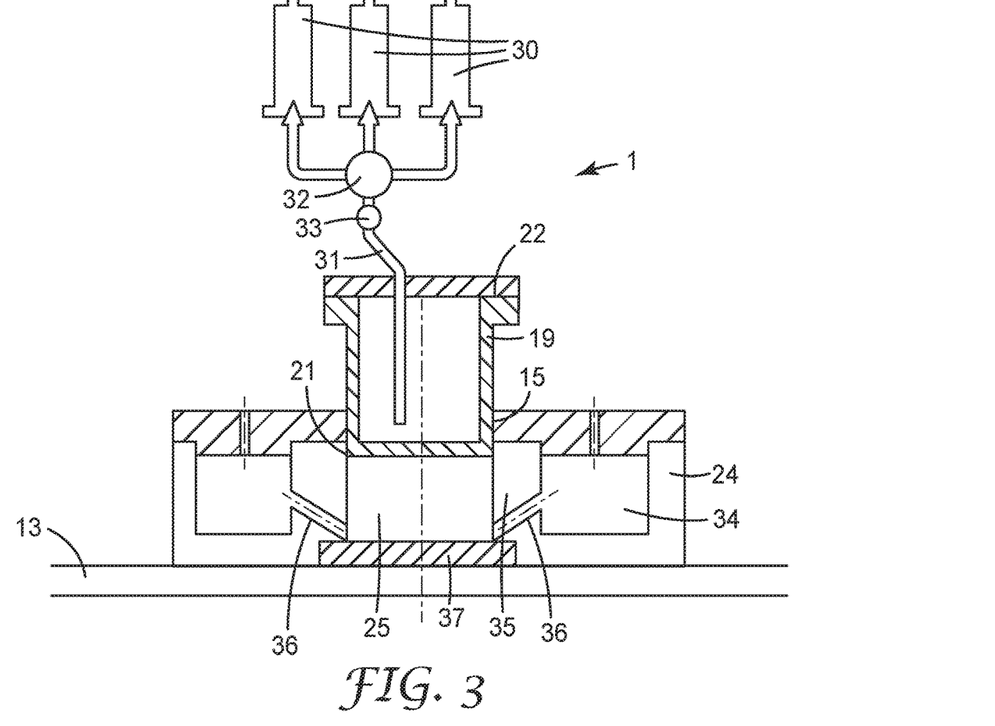
FIG. 3 is a view of a device according to another embodiment of the invention.

For building up an object that exhibits two or more different colors, differently colored light hardenable materials can be provided in the receptacle as shown in FIG. 3. Instead of or in addition to different colors the light hardenable material may be selected to exhibit or provide different material strengths, translucencies or other physical properties. The term "colored light hardenable material" thereby refers to the color of the material when hardened. The device 1 has a plurality of tanks 30 containing differently colored light hardenable materials. In the example the tanks are connectable via a mixing valve 33 to a common pipe 31. The mixing valve 33 can be adjusted by computer control for enabling the flow of only one colored light hardenable material from one of the tanks 30. Further, the mixing valve 33 can be adjusted by computer control for enabling the flow of two or more colored light hardenable materials from several tanks 30 in a determined ratio to each other. Thus, the color of the light hardenable material can be controlled by the mixing valve 33. The device 1 further has a block valve 32 for controlling the overall flow of the unmixed or mixed light hardenable material. Although illustrated as separate components, the mixing valve 32 and the block valve 33 may combined in one valve.

In operation of the device 1 an initial portion of the object may be built up from a light hardenable material that has a first color, for example a color provided from a single tank or mixed from multiple tanks. For changing the first color into a different second color the light hardenable material of the second color may be used to displace any light hardenable material of the first color from the reservoir 28. This can be achieved by providing the light hardenable material of the second color in a sufficient amount to displace and thus replace any light hardenable material of the first color from the reservoir 28.

The containment 24 forms a repository 34 for receiving light hardenable material displaced from the reservoir 28. The repository 34 in the example is formed by a circumferential groove around the hole 25. The repository 34 is separated from the hole 25 by a wall 35 of the containment 24. However, the hole 25 and the repository 34 are in fluid communication via channels 36. In the example, the hole 25 is closed by a transparent baseplate 37 so that the reservoir 28 in the example is formed by the containment 24 in combination with the baseplate 37. It is however noted that the baseplate in another example (as for example illustrated in FIG. 2) is optional. If the baseplate 37 is present, a contamination of the transparent plate 13 with light hardenable material is prevented. Thus, after building up an object the containment 24 can be replaced by a new containment without the need of cleaning the transparent plate 13 of the device 1.

As shown, the channels 36 are arranged inclined relative to the plane of the exposure surface 13, meaning that the channels 36 extend angularly upwards. Thereby the length of the channels 36 is maximized so as to provide an effective separation of the light hardenable material within the reservoir 28 and other (differently colored) light hardenable material within the repository.

In the example the receptacle 19 has a cylindrical outer shape that snugly fits within the cylindrical hole 25. Accordingly, light hardenable material that is urged through the perforated build platform 15 causes light hardenable material contained within the reservoir 25 to be displaced toward the repository 34. The receptacle 19 is further sealed at its second end 22 so that the light hardenable material can be pressurized within the receptacle 19 for causing the light hardenable material to be urged through the perforated build platform 15. The pressure for pressurizing the light hardenable material may be provided by compressed air or a pump that may be used to push the light hardenable material through the pipe 31 toward the receptacle 19.

Figure 4:
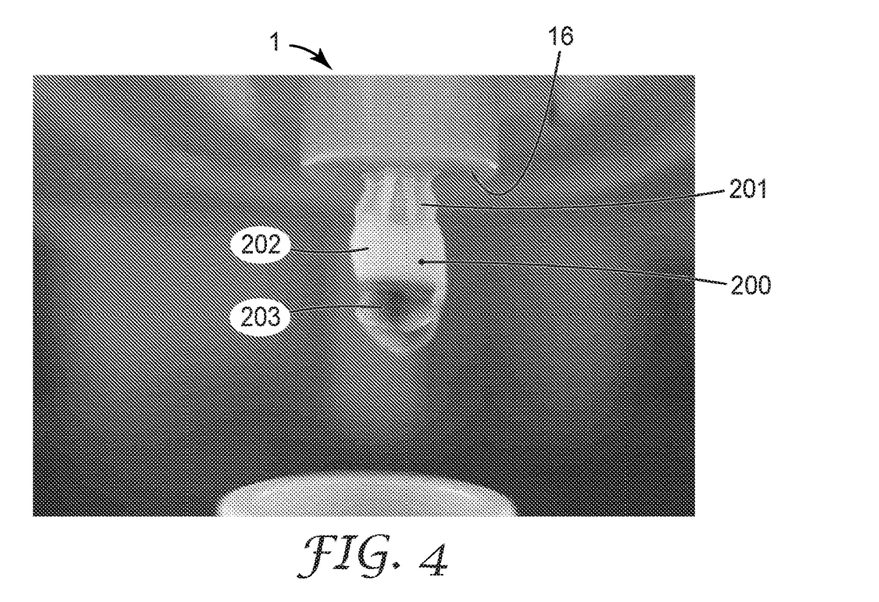
FIG. 4 is a photograph of an object built in a device according to an embodiment of the invention.

FIG. 4 is a photograph of an object built up with a device 1 according to the invention. In the example the object is a dental restoration 200. The dental restoration 200 is suspended at a plurality of pins 201. The dental restoration 200 and the pins 201 are monolithically formed with one another. The pins 201 are retained at the build surface 16 and leave portions of the perforated build surface 16 uncovered. Thus, light hardenable material can be supplied through the perforation although the object is retained at the build surface 16. The dental restoration shown further is built up at two different colors. In the example a first color 202 generally corresponds to a natural tooth color while a second color 203 is a much darker mock-up color that was used for demonstrating the fact that multiple colors can be used for building up the object and for demonstrating the transition between two colors. This is advantageous for the manufacturing of dental restorations exhibiting a pleasant natural appearance. It is noted that although the transition in the photograph can be well recognized due to the use of a mock-up color, any transitions between two different tooth colors are hardly visible.

Figure 5:
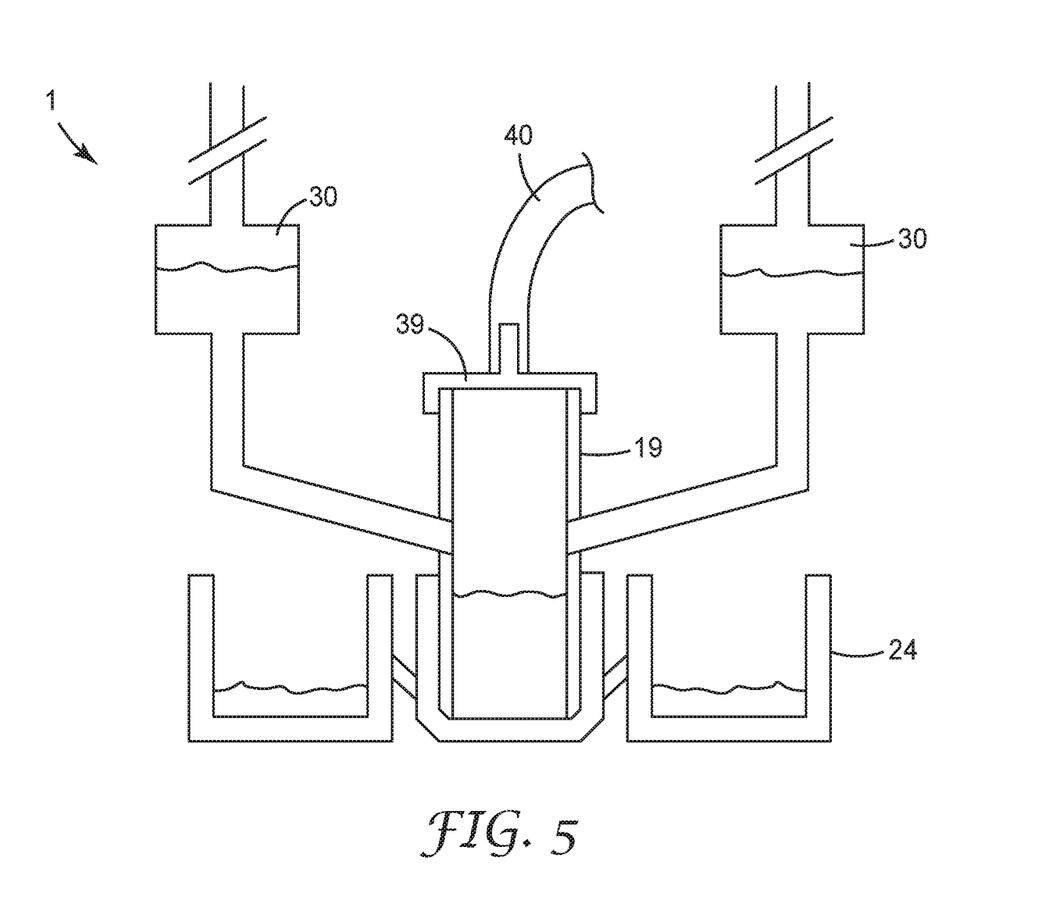
FIG. 5 is a view of a device according to still another embodiment of the invention.

FIG. 5 shows a further device 1 that is configured for building up objects from different colors. The device 1 is generally identical with the device shown in FIG. 3 except for the configuration for supplying the differently colored light hardenable material. In the example, two tanks 30 are each in fluid communication with the receptacle 19. More than two tanks may be provided each being in fluid communication with the receptacle 19. Accordingly, the light hardenable materials from the tanks 30 can be provided individually and/or in combination into the receptacle 19. As an advantage relative to pre-mixing the light hardenable materials in a pipe (as in FIG. 3) in this example color transitions (for example a marbling) can be generated in horizontal and vertical dimensions. The tanks 30 are open toward the receptacle 19 but are otherwise closed. A ventilation valve is provided for each of the tanks 30 by means of which the flow of the light hardenable material can be controlled. For example, the ventilation valve may be opened for permitting air to flow into the respective tank 30 so that the light hardenable material is permitted to flow toward the receptacle 19 by the force of gravity. As the ventilation valve is closed air is prevented to flow into the tank 30 so that the flow of the light hardenable material ceases due to a vacuum building up in the tank 30. Preferably the ventilation valves can be individually controlled by a computer. Thus, the color of the object built up can be adjusted by computer control. The receptacle 19 may comprise a closure 39 with an air supply 40. The air supply 40 can be used for pressurizing the receptacle 10 for urging light hardenable material contained therein through the perforation. The containment 24 of the device 1 corresponds to the containment shown in FIG. 3.

Figure 6:
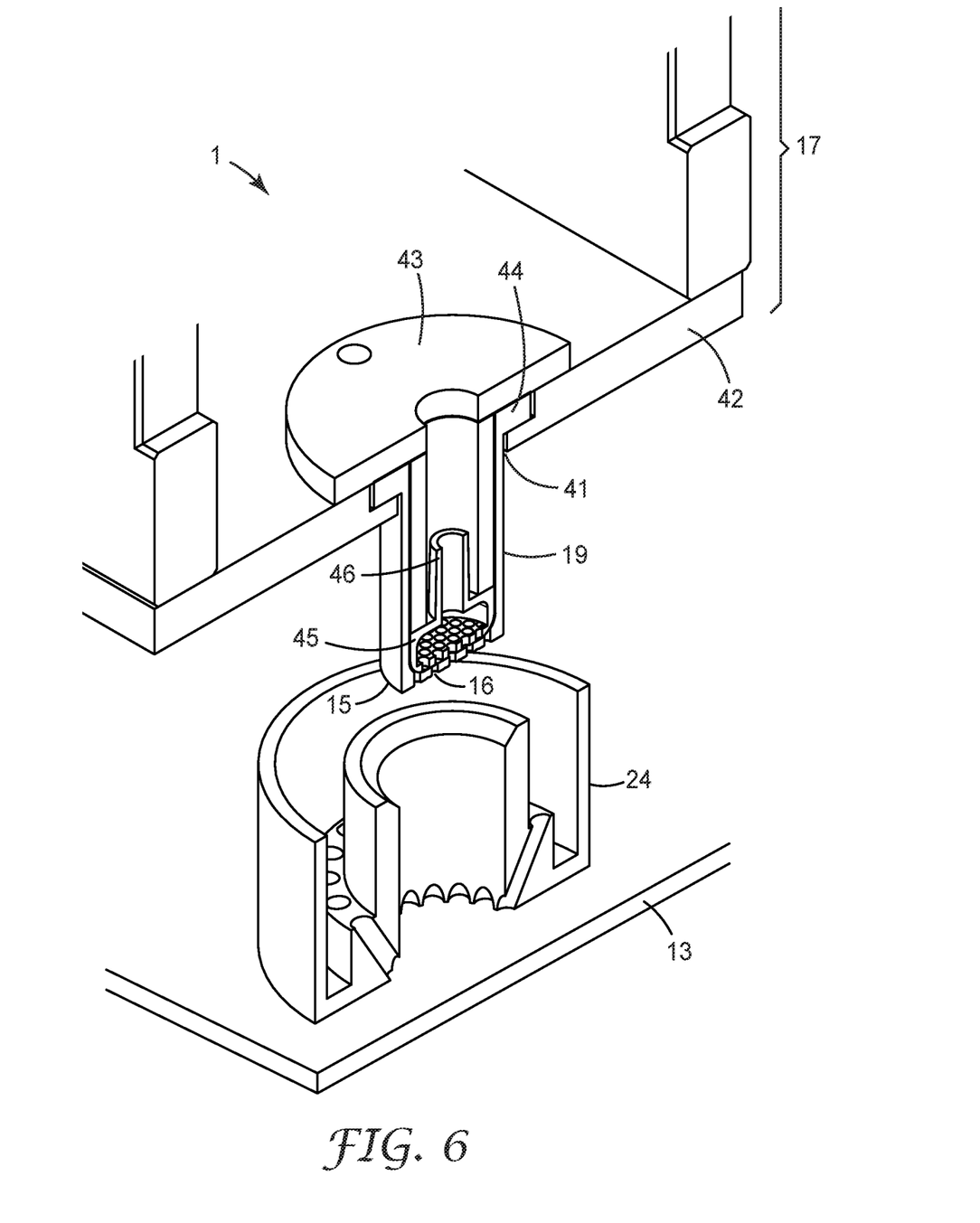
FIG. 6 is a perspective partially cross-sectional view of a device according to an embodiment of the invention.

FIG. 6 shows the receptacle 19 and the containment 24 of the device 1 in more detail. According to the invention the receptacle 19 and the containment 24 are preferably exchangeable relative to the remainder of the device 1. In particular, the device 1 is preferably configured such that the containment 24 can be removably attached to the transparent plate 13. Various means for removably attaching the containment 24 can be used, like for example clamping, screwing or reversibly bonding. Further, the device 1 is preferably configured such that the receptacle can be removably attached to the head 17 of the device 1. In the example, the head 17 has a holding plate 42 having a bore 41 in which the receptacle 19 is received. The receptacle 19 is retained in the vertical dimension between by a washer 43 that fixes a flange 44 of the receptacle 19 to the holding plate 42. Other means for removably attaching the receptacle 19 are possible as appropriate.

In the example the receptacle contains a spout 45 which has an inlet 46 and an outlet 47. The outlet 47 is formed by a perforation, in particular by a multiplicity of passageways.

The spout 45 at least adjacent the outlet 47 snugly fits into the receptacle and thus covers the entire perforation of the build platform 15 of the receptacle 19. Accordingly, any light hardenable material supplied through the inlet 46 is spread by via the perforation of the outlet 47 over the perforation of the build platform 15 of the receptacle 19.

Figure 7:
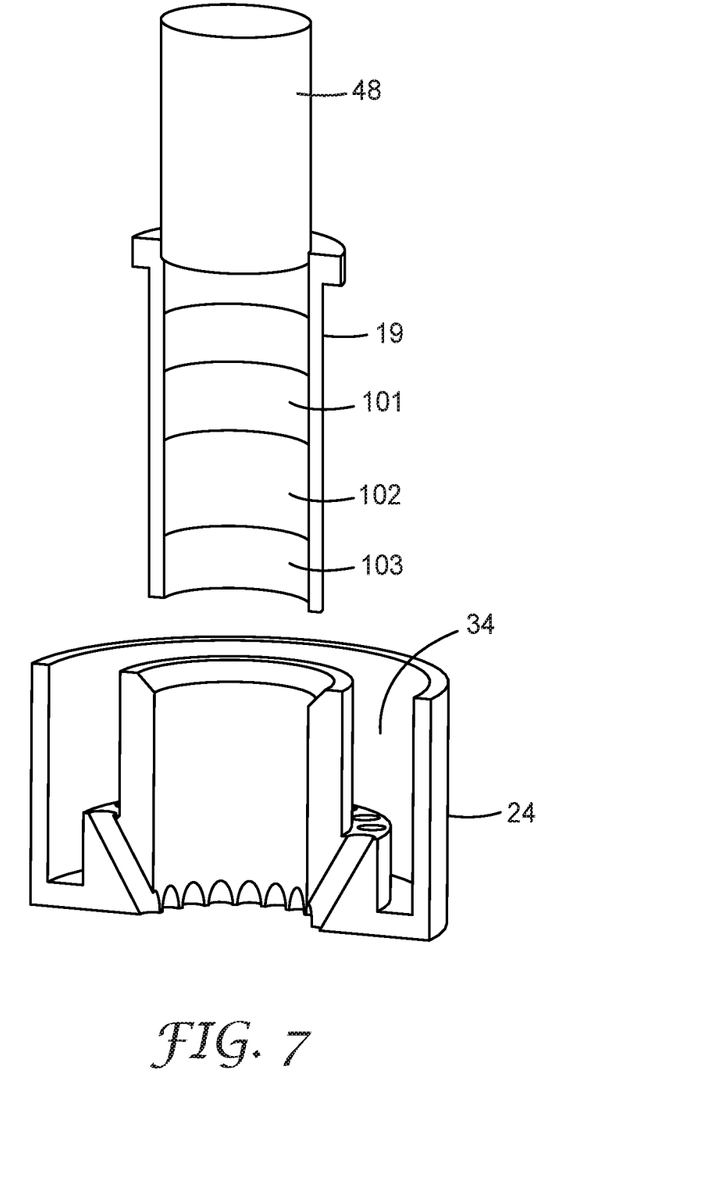
FIG. 7 is a perspective cross-sectional view of a device according to a further embodiment of the invention.

FIG. 7 shows a receptacle 19 which is prefilled with light hardenable material of three different colors 101, 102, 103. The receptacle in the example has a piston 48 for urging the light hardenable materials toward the build platform 15. The receptacle may be pre-filled with less or more colors, for example may be pre-filled with one light hardenable material or two light hardenable materials of two colors. The amounts of the differently colored light hardenable materials may be selected in accordance to the proportions of the object to be colored differently. Alternatively, each color may be provided at an amount sufficient to build up an entire object, for example a dental restoration. In this case, the colored proportions of the object may be controlled by the device for building up the object. For example, the object may be partially built up with a first color. Any remaining light hardenable material of the first color may be expelled from the receptacle and collected in the repository 34 of the containment. Then the build-up process may be continued using a second color, and so forth.

For preventing the different light hardenable materials to intermingle during storage (or transport) the receptacle may be consecutively filled with relatively high viscos but still flowable individual light hardenable materials. A pre-filled receptacle may be stored for several minutes or hours without the individual light hardenable materials intermingle substantially.

What is claimed is:

1. A device for progressively building up an object from a light hardenable material, comprising
    a perforated build platform for the object, the build platform forming a build surface that faces a light source, the build platform and the light source being positionable relative to each other by computer control,
    wherein the device is configured for supplying the light hardenable material through the perforation of the build platform for building up the object;
    wherein the perforation comprises a plurality of passageways extending through the build platform; and
    wherein the device has a receptacle for receiving the light hardenable material, the receptacle having a first end that is closed by the build platform and an open second end and wherein the receptacle is arranged with the first end oriented toward the direction of gravity and with the second open end away from the direction of gravity.

2. The device of claim 1, wherein the second end is closed by a piston being movably arranged within the receptacle for urging the light hardenable material toward the perforation.

3. The device of claim 1, wherein a tank for the light hardenable material is provided for supplying the light hardenable material through the open second end into the receptacle.

4. The device of claim 1, further comprising a circumferential containment forming a hole within which the build platform can be positioned.

5. The device of claim 4, wherein the light source comprises a transparent plate on which the containment is disposed.

6. The device of claim 5, wherein the hole of the containment is a through-hole and wherein the containment in combination with the plate forms a reservoir in which the light hardenable material is hardenable by light emitted by the light source.

7. The device of claim 4, wherein the containment forms a repository for excess light hardenable material, wherein the hole and the repository are in fluid communication through (or past) a wall that separates the hole and the repository from each other.

8. The device of claim 4, further comprising a tray that comprises the containment, the tray having at least a transparent portion that overlaps or closes one opening of the hole.

9. The device of claim 1, further comprising the light hardenable material, wherein the light hardenable material is optionally provided in the form of at least two partial quantities of different colors, translucencies, material strengths or combinations thereof.

10. The device of claim 1, wherein the at least two quantities are pre-filled in the receptacle.

11. A method for progressively building up an object from a light hardenable material, comprising:
    (a) providing a device that comprises a perforated build platform for the object, the build platform forming a build surface that faces a light source, the build platform and the light source being positionable relative to each other by computer control, wherein the device is configured for supplying the light hardenable material through the perforation of the build platform for building up the object;
    (b) positioning the build surface relative to the light source;
    (c) providing a portion of the light hardenable material through the perforation of the build platform by the force of gravity in an area between the build surface and the light source, wherein the perforation comprises a plurality of passageways extending through the build platform, and wherein the device has a receptacle for receiving the light hardenable material, the receptacle having a first end that is closed by the build platform and an open second end and wherein the receptacle is arranged with the first end oriented toward the direction of gravity and with the second open end away from the direction of gravity;
    (d) causing at least part of the portion of the light hardenable material to harden by light emitted from the light source;
    (e) repeating steps (b) to (d) and thereby building up the object.

12. The method of claim 11, wherein step (c) comprises the step of providing a portion of the light hardenable material having a first color in the area between the build surface and the light source and wherein the method further comprises the step of providing a portion of the light hardenable material having a second color in the area between the build surface and the light source and thereby displacing the portion of the light hardenable material having the first color.

13. The method of claim 12, further comprising the step of storing the portion of the light hardenable material having the first color in a repository of a containment of the device.

* * * * *